United States Patent
Imaeda

(10) Patent No.: US 7,075,573 B2
(45) Date of Patent: Jul. 11, 2006

(54) REMOTE SYSTEM FOR IMAGE STORAGE AND SEARCH

(75) Inventor: Eiji Imaeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 852 days.

(21) Appl. No.: 10/011,404

(22) Filed: Dec. 11, 2001

(65) Prior Publication Data
US 2002/0075392 A1   Jun. 20, 2002

(30) Foreign Application Priority Data
Dec. 14, 2000  (JP) .............................. 2000-380419

(51) Int. Cl.
H04N 5/76  (2006.01)
(52) U.S. Cl. ................................. 348/231.99
(58) Field of Classification Search ........... 348/207.99, 348/231.99
See application file for complete search history.

(56) References Cited

U.S. PATENT DOCUMENTS

| | | | |
|---|---|---|---|
| 5,493,335 A * | 2/1996 | Parulski et al. ........... | 348/231.6 |
| 5,819,261 A | 10/1998 | Takahashi et al. .............. | 707/3 |
| 5,890,070 A | 3/1999 | Hamada ..................... | 455/524 |
| 6,337,712 B1 | 1/2002 | Shiota et al. ................ | 348/231 |
| 6,668,134 B1 * | 12/2003 | Niikawa ........................ | 386/95 |
| 6,834,130 B1 * | 12/2004 | Niikawa et al. ............ | 382/305 |
| 2001/0052933 A1 * | 12/2001 | Nybo et al. .................. | 348/207 |
| 2005/0057658 A1 * | 3/2005 | Ohmura et al. ........ | 348/207.99 |

FOREIGN PATENT DOCUMENTS

| | | |
|---|---|---|
| EP | 0 833 494 A2 | 4/1998 |
| EP | 0844781 | 5/1998 |
| EP | 0991260 | 4/2000 |
| JP | 4-218873 | 8/1992 |
| JP | 06-195393 | 7/1994 |
| JP | 08-314954 | 11/1996 |
| JP | 10-341364 | 12/1997 |
| JP | 10-150523 | 6/1998 |
| JP | 10-336238 | 12/1998 |
| JP | 11-098501 | 4/1999 |
| JP | 11-272576 | 10/1999 |
| JP | 11-296462 | 10/1999 |
| JP | 2000-92440 | 3/2000 |
| JP | 2000-099529 | 4/2000 |
| JP | 2000-115685 | 4/2000 |
| JP | 2000-278550 | 10/2000 |

* cited by examiner

Primary Examiner—David Ometz
Assistant Examiner—James M. Hannett
(74) Attorney, Agent, or Firm—Fitzpatrick, Cella, Harper & Scinto

(57) ABSTRACT

A communication device having a memory for storing image data and thumbnail data is capable of transmitting the image data to an image storage unit. When the communication device transmits some of the image data stored in the memory, it erases the transmitted image data in the memory to increase an area in the memory where data can be stored. The communication device transmits to the image storage unit a search request for searching for the image data corresponding to the selected thumbnail data during browsing of the thumbnail data, and receives the image data found by searching from the image storage unit.

13 Claims, 11 Drawing Sheets

REMOTE SYSTEM FOR IMAGE STORAGE AND SEARCH

BACKGROUND OF THE INVENTION

1. Field of the Invention

The present invention relates to a communication device and a communication system.

2. Related Background Art

Remarkable progress has been made in wireless communication technology in recent years. A third generation mobile communication system based on a wideband code division multiple access (W-CDMA) system and called International Mobile Telecommunications-2000 (IMT-2000) forms a communication network capable of data transfer at a rate of 384 kbps in a mobile communication environment.

An international standardization organization called Third Generation Partnership Project (3GPP) advances a process of standardizing IMT-2000 and successively releases the IMT-2000 standard specification, which are made public on a web site (http://www.3gpp.org/) or through other media.

Further, IMT-2000 is the first system having introduced therein a user identification module called a Universal Subscriber Identify Module (USIM). A right granted to a user to use a portable telephone, which is conventionally assigned to the portable telephone by user subscription, is incorporated in one USIM. The user can use any of a plurality of communication units under the same user subscription by attaching the USIM to the communication unit.

Meanwhile, in digital cameras, image data is generally managed in accordance with a standard called Design rule for Camera File system (DCF). DCF is an image file format standard prescribed in JEIDA-492-1998 by Japan Electronic Industry Development Association (JEIDA). Image data to be stored is compressed into a DCF file by JPEG (Joint Photographic Experts Group) compression.

Here, JPEG compression is an image coding method for compressing image data in such a manner that original image data undergoes discrete cosine transform on a predetermined block basis to be converted into data per frequency components, and data components of little visual influence in maintaining image quality are removed from the image data.

Conventionally, an image communication system is known in which an image photographed with a digital camera is transferred to a computer in a remote location by wireless communication through a communication line.

In a digital camera used in such a conventional image communication system, data on a photographed image is transferred to an internal frame memory, the data in the frame memory is JPEG-compressed by an internal CPU, and the compressed data is stored in DCF format in a memory card. An operator operates the camera to transfer the stored image data from a wireless communication unit to an image server to store the data in the same.

FIG. 2 shows a format of the image data to be transferred at this time. Referring to FIG. 2, a portion 201 is SOT (Start Of Transmission) designating the beginning of a transferred frame; a portion 202 is transfer length information indicating the length of the transferred frame, a portion 203 is SOI (Start Of Image) designating the beginning of the DCF data; a portion 204 is APP1 information (e.g., date and time information) in accordance with the DCF standard; a portion 205 is JPEG compressed image data in accordance with the DCF standard; a portion 206 is EOI (End Of Image) information designating the end of the DCF data; and a portion 207 is EOT (End Of Transmission) designating the end of transferred data.

Information between SOI information 203 and EOI information 206 is the DCF data in accordance with the DCF standard.

In the above-described conventional image communication system, an entire image photographed with the digital camera is transferred to an image server and no information on the transferred image is left on the digital camera side.

When image data is transferred from the image server, APP1 information (e.g., date and time information) about image data stored in the image server is transferred to the digital camera side by an operation on the digital camera side to be checked. The operator selects necessary image data by referring to the date and time information. The selected information is transferred to the digital camera to enable the operator to view the image.

In the above-described conventional system, however, only the date and time information can be referred to on the digital camera side as information for identification of images, which is transferred from the image server. Therefore, the operator cannot check whether a transferred image is an image selected by the operator until the corresponding image data is transferred and displayed. If images other than the selected image are transferred, transfer time and communication cost for the operation are wasted.

In a case where the image server is shared by a plurality of persons, images other than those transferred by one person may be stored in the image server. In such a situation, the above-described problem is more serious.

Situations in which the above-described problem may arise are not limited to the case of transfer of images photographed with the digital camera to the image server. That is, there arises also the same problem in a case where an image stored in a personal computer is erased after the image has been transferred from the personal computer to an image server.

The problem of difficulty in selecting an image to be viewed by referring to the date and time information is not limited to the case where a person who transferred an image to an image server views the image by himself or herself. There arises also the same problem in a case where some other person wishes to view the image.

SUMMARY OF THE INVENTION

An object of the present invention is to provide a communication device or a communication system having improved operability.

Another object of the present invention is to provide a communication device or a communication system designed to avoid a reduction in operability while saving memory capacity.

Still another object of the present invention is to provide a communication device or a communication system in which an image to be transferred can be checked in advance by means of thumbnail data before transfer of the image from an image server.

A further object of the present invention is to provide a communication device or a communication system in which a user can search for image data through the communication device connected to a public network by using user information for identification of the user on the public network side.

These and other objects and features of the present invention will become apparent from the following detailed description of preferred embodiments of the invention.

DESCRIPTION OF THE PREFERRED EMBODIMENTS

Figure 3:
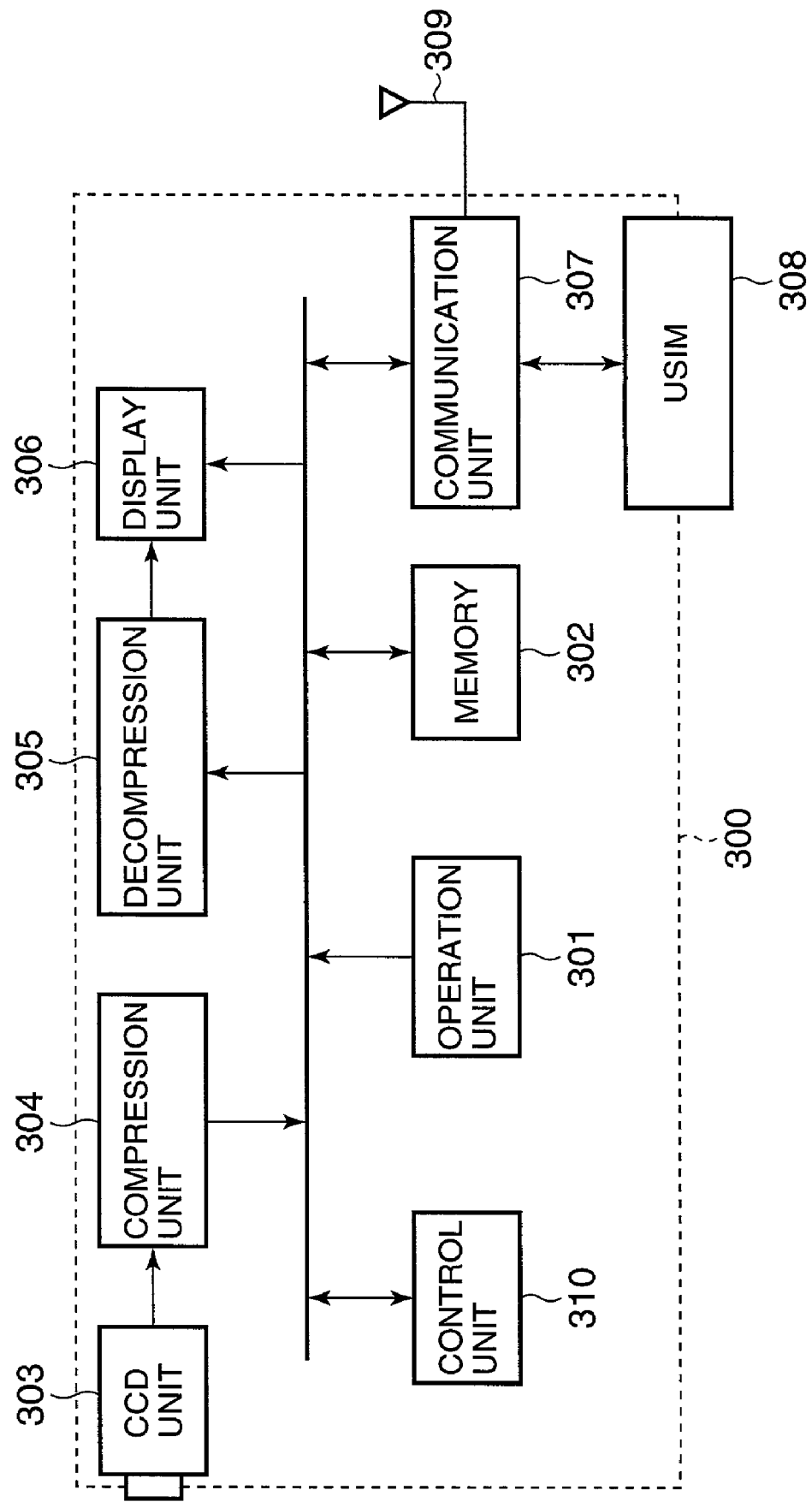
FIG. 3 is a block diagram of a digital camera in the embodiment of the present invention.

FIG. 3 is a block diagram showing the configuration of a digital camera which is a communication device in an embodiment of the present invention. This digital camera is one of devices having image storage functions as well as communication functions. The digital camera is an example of a device which has a means for inputting image data, and in which input image data is stored in a memory. The present invention can be applied to a personal computer having an image pickup unit or a portable telephone.

Referring to FIG. 3, the digital camera has a camera body 300, an operation unit 301, a memory 302, a charge coupled device (CCD) unit 303, a compression unit 304, a decompression unit 305, a display unit 306, a communication unit 307, a USIM 308, an antenna 309, and a control unit 310 for overall control of the operation of the digital camera.

The operation unit 301 is an operation input unit through which the operation of the digital camera is controlled by an operator. The operation unit 301 is constituted by a power switch, a shutter button, a mode change switch, a selecting switch, and a communication control switch.

The memory 302 stores image data, including compressed data and thumbnail data output from the compression unit 304 described below. The memory 302 can also store image data received from the communication unit 307 described below. Further, a program for the control unit 310 is stored in the memory 302. The memory 302 is constituted by a nonvolatile flash memory.

The CCD unit 303 is constituted by a lens unit having an automatic focusing function, a CCD light receiving device, and a CCD control circuit. Data on an image formed by light imaged on the CCD light receiving device through the lens unit is read out and transferred to the compression unit 304 by the CCD control circuit.

The compression unit 304 performs JPEG compression processing on image data transferred from the CCD unit 302, and transfers the compressed data to the memory 302. The compression unit 304 also prepares thumbnail image JPEG data and transfers this data to the memory 302. In the present invention, a compression method other than JPEG may alternatively be used.

The decompression unit 305 performs JPEG decompression processing on JPEG compressed data or thumbnail data from the memory 302 to restore the original image data. Image data decompressed by this decompression processing is transferred to the display unit 306 to be displayed.

The display unit 306 displays image data transferred from the decompression unit 305 and control information for identification of images by the operator under the control of the control unit 300.

The communication unit 307 is arranged to realized IMT-2000 communication functions. The communication unit 307 operates under the control of the control unit 310 to transfer image data to an image server in a remote location or receive image data transferred from the image server through a public wireless network. In the present invention, a wireless communication method other than IMT-2000 may alternatively be used. Also, the present invention can be realized in a cable communication system.

The USIM 308 is a user authentication module (Universal Subscriber Identity Module) in accordance with the IMT-2000 standards. The USIM 308 is constructed so as to be detachably attached to the digital camera. In a nonvolatile memory section in the USIM 308, user authentication information is written. More specifically, a charging-target telephone number is written in the USIM 308. When the calling operation to connect to the public network is performed by using the telephone number, a person who owns the USIM 308 with the telephone number is charged for the communication. In the case of a system not using the USIM for user authentication, a telephone number is stored in the memory 302.

The control unit 310 has a clock function for managing date and time, and records the date and time of photography of each of photographed images while storing the photographed images in the memory 302. The control unit 310 operates on the basis of the program stored in the memory 302.

Data output from the compression unit 304 will be described in more detail.

Generally, in digital cameras, image data is managed in a data format called Design rule for Camera File system (DCF). In the digital camera 300 in accordance with the present invention, image data is also managed in a format in accordance with DCF.

DCF is a file format for use in digital cameras settled on the basis an image file format standard known as Exif. In DCF, a file frame configuration and a directory configuration are prescribed.

Details of the standard for DCF are prescribed in the standards JEIDA-49-2-1998 issued from the Japan Electronic Industry Development Association. Details of the standard for Exif are prescribed in the standards JEIDA-49-1998 also issued from the Japan Electronic Industry Development Association.

In DCF format, APP1 (Application marker segment 1) information indicating various sorts of information about an image and data on the JPEG compressed basis image are set in a data frame defined between SOI (Start Of Image) designating the beginning of the data frame and EOI (End Of Image) information designating the end of the data frame. A JPEG compressed thumbnail image can be included in APP1 information. In DCF format, the size of a thumbnail image is fixed at 160×120 pixels.

JPEG compression will be outlined below. JPEG, which is standardized by ISO (International Organization for Standardization) and ITU-T (International Telecommunication Union Telecommunication Standardization Sector), is an image coding method which compresses image data so that the amount of data is reduced to about $\frac{1}{10}$ to $\frac{1}{100}$.

In the JPEG compression method, blocks of image data in predetermined two-dimensional regions are treated as units, and image data in each block is converted into data per frequency components by discrete cosine transform (DCT), thus compressing the image data. If the compression rate is increased, the image quality degrades. To improve the image quality, the compression rate is reduced.

IMT-2000 on which the method for communication by the communication unit 307 is based will be described.

IMT-2000 is a communication network of a third generation mobile communication system based on a Wideband CDMA (W-CDMA) system to which a code division multiple access (CDMA) method was applied as a wireless communication method.

In IMT-2000, a data transfer rate of 368 kbps at the maximum in a mobile environment and a data transfer rate of 2048 kbps at the maximum in a fixed environment are practicable.

The process of standardizing IMT-2000 is being advanced by 3GPP, which is an international standardization organization. IMT-2000 standards thereby set are being successively released and are made public on a web site (http://www.3gpp.org/) or through other media.

Meanwhile, in the present invention, a wireless communication method other than IMT-2000 may alternatively be used. Also, a frequency division multiplex (FDM) communication method, a time division multiplex (TDM) communication method, or the like may alternatively be used. The present invention can also be realized in a cable communication system.

Figure 4:
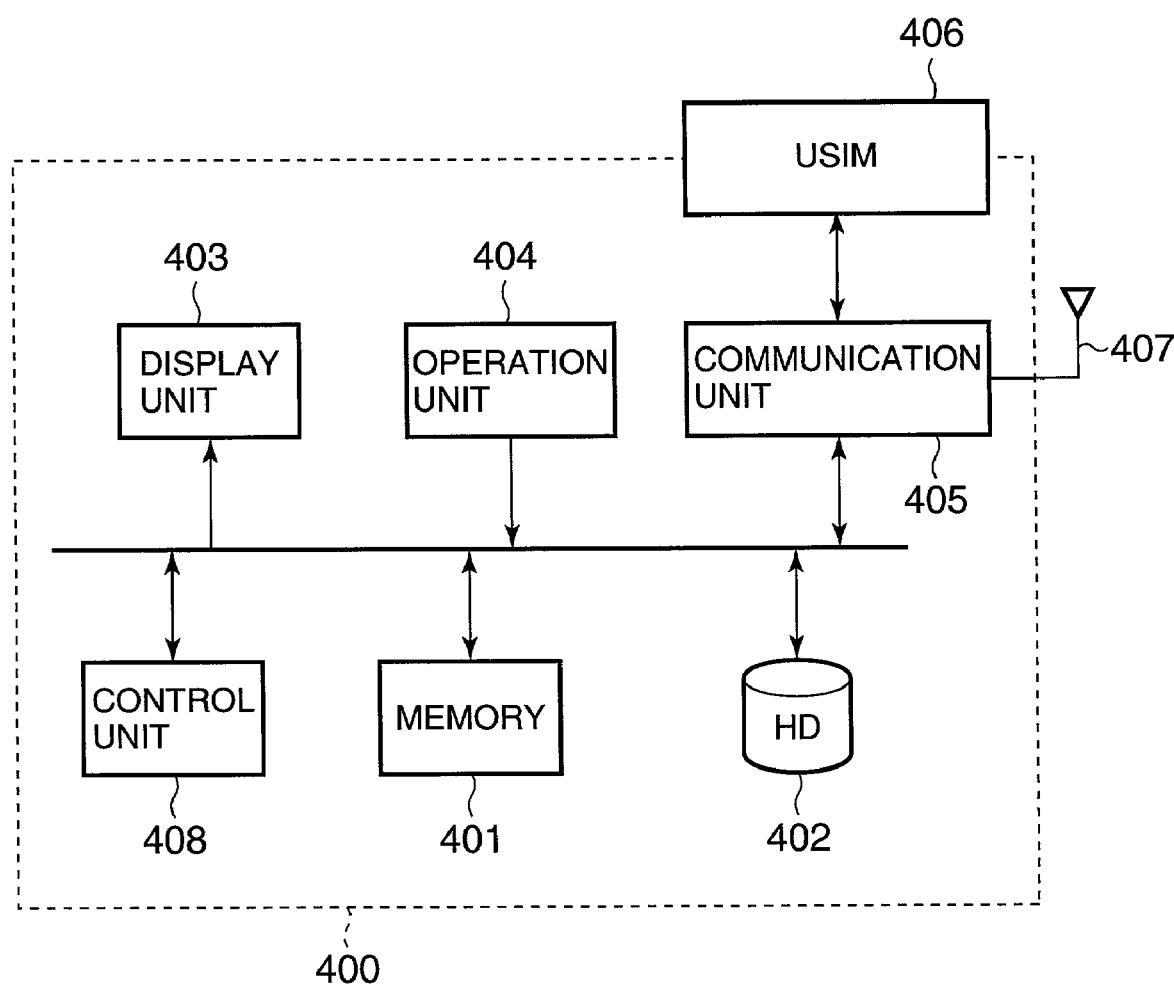
FIG. 4 is a block diagram of an image server in the embodiment of the present invention.

FIG. 4 is a block diagram of an image server which is an image storage/search apparatus in the embodiment of the present invention.

Referring to FIG. 4, the image server has an image server body 400, a memory 401, a hard disk (HD) 402, a display unit 403, an operation unit 404, a communication unit 405, a USIM 406, an antenna 407, and a control unit 408 for overall control of the operation of the image server.

The memory 401 is a work memory used by the control unit 408 when data received by the communication unit 405 or JPEG compressed data in the HD 402 is decompressed to restore the original image, or in other situations.

The HD 402 is a storage device in which a processing program which runs in the control unit 408 and data received by the communication unit 405 are stored.

The display unit 403 is constituted by a cathode ray tube (CRT) display on which the state of operation of the image server and image data are displayed.

The operation unit 404 is an operation input unit through which the operation of the image server is controlled by an operator. The operation unit 404 is constituted by a keyboard, a mouse, and a power switch.

The communication unit 405 is arranged to realized IMT-2000 communication functions, as is the above-described communication unit 307. The communication unit 405 operates under the control of the control unit 400 to transfer image data to the digital camera in a remote location or receive image data transferred from the digital camera through the public wireless network. In the present invention, a wireless communication method other than IMT-2000 may alternatively be used. Also, the present invention can be realized in a cable communication system.

The USIM 407 is a user authentication module (Universal Subscriber Identity Module) in accordance with the IMT-2000 standards, as is the above-described USIM 308. The USIM 407 is constructed so as to be detachably attached to the image server. In a nonvolatile memory section in the USIM 407, user authentication information is written. More specifically, a charging-target telephone number is written in the USIM 407. When the calling operation to connect to the public network is performed by using the telephone number, a person who owns the USIM 407 with the telephone number is charged for communication. In a case where the server 400 is connected to a communication system requiring no USIM, it is not necessary to connect the USIM 406 to the server 400.

Meanwhile, the communication unit 404 of the image server 400 is not limited to the type using a wireless communication system. The communication unit 404 may be connected to the public line to the Internet by means of a cable.

The operation of an image communication system constituted by the digital camera 300 and the image server 400 will now be described.

Figure 7:
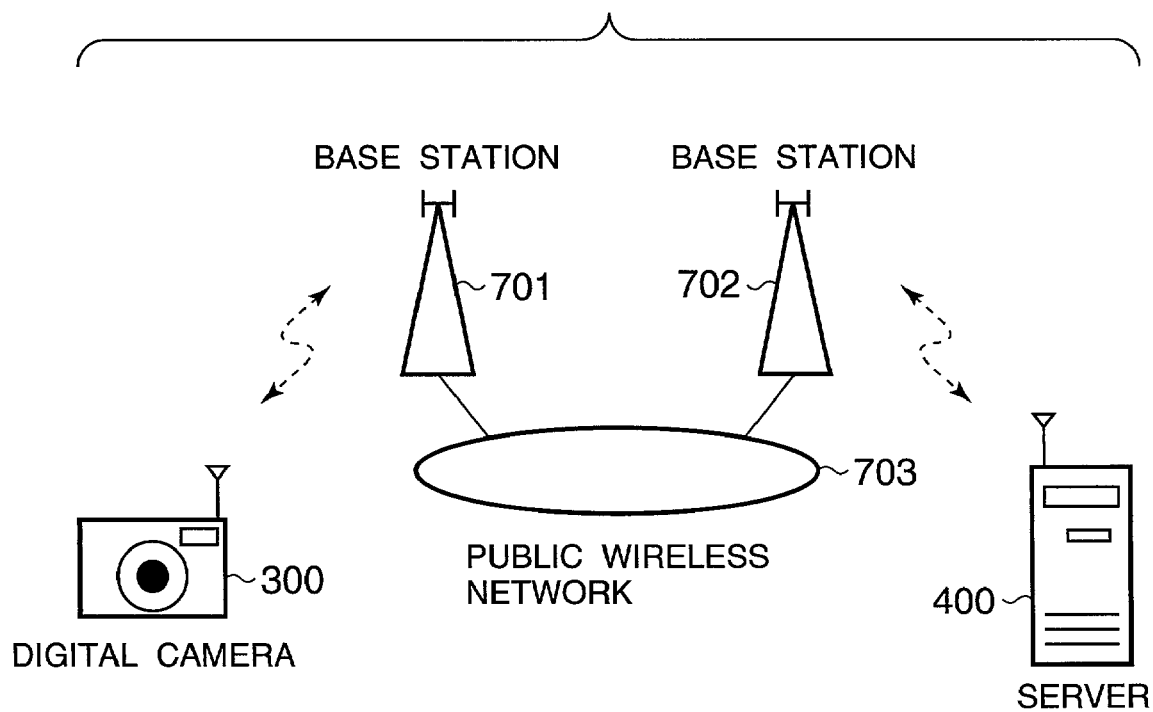
FIG. 7 is a diagram showing a construction of the image communication system in the embodiment of the present invention.

The configuration of the image communication system is as shown in FIG. 7.

In FIG. 7 are illustrated a public wireless network 703, a base station 701 to which the digital camera 300 functioning as a communication terminal in the public wireless network 703 is connected, and a base station 702 to which the image server 400 functioning as a communication terminal in the public wireless network 703 is connected. The image server 400 may be connected to the public wireless network 703 via a public cable network (ISDN, PSPN) or the Internet used in place of the base station 702 and the public wireless network 703.

The digital camera 300 performs the calling operation to connect to the image server 400 via the base station 701 and the base station 702 to perform communication of image data, etc.

Figure 1:
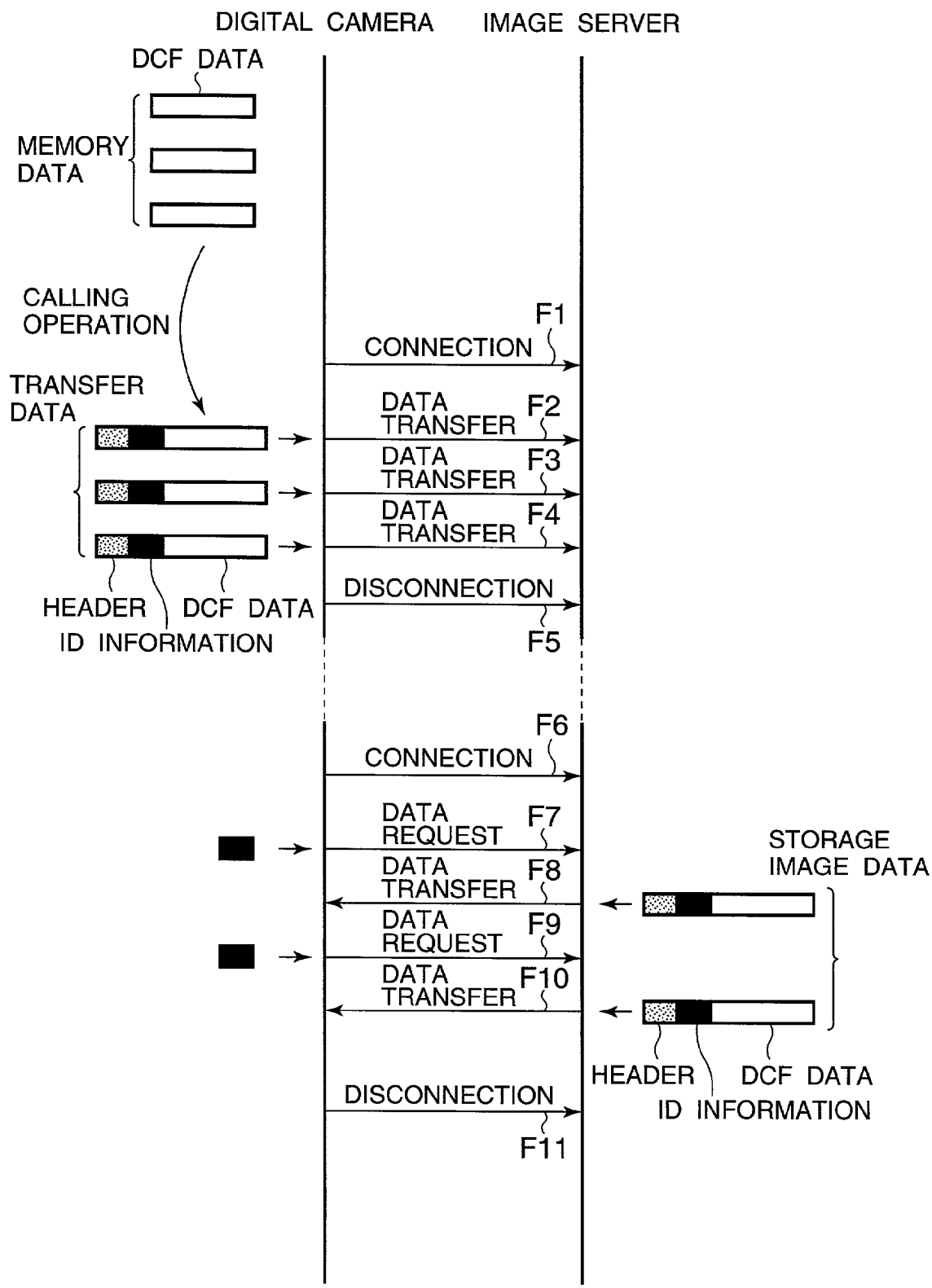
FIG. 1 is a diagram showing communication flow in an image communication system in an embodiment of the present invention.
Figure 2:
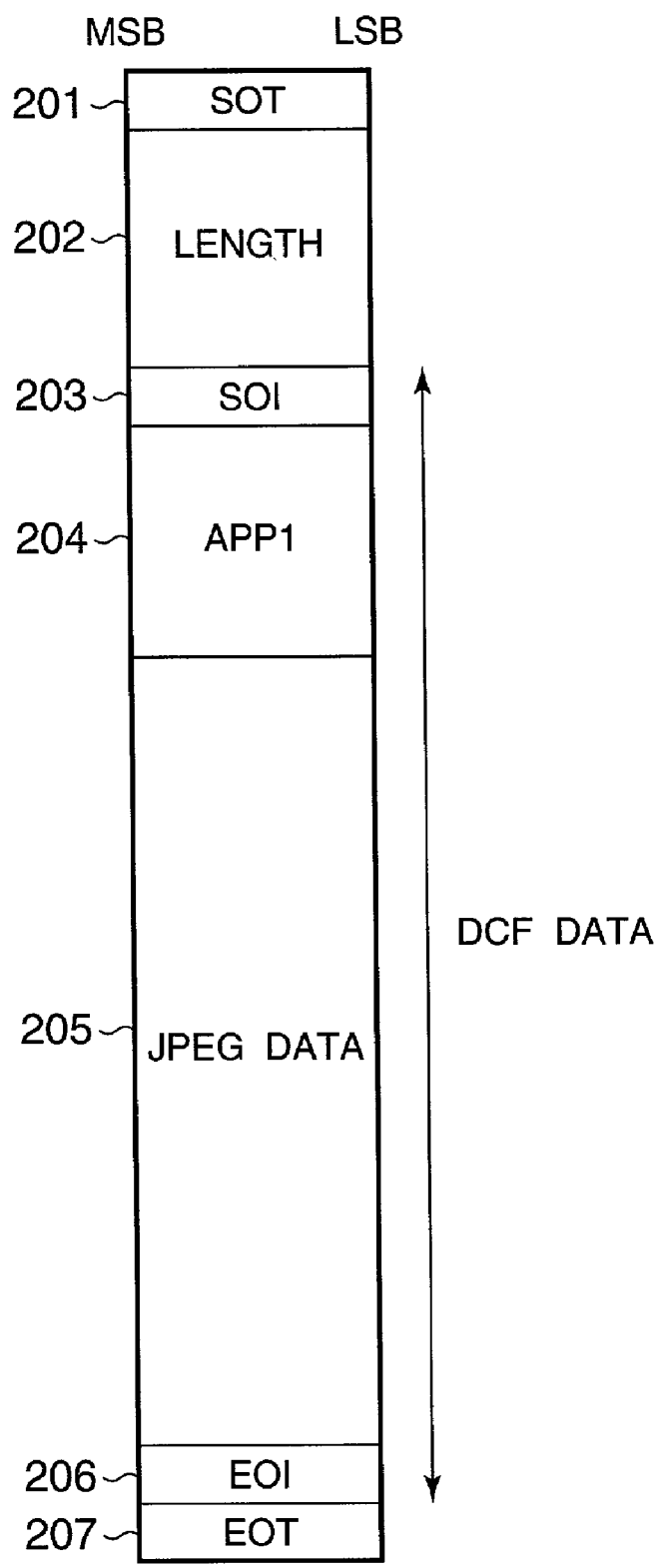
FIG. 2 is a diagram showing a format of conventional transferred data.
Figure 8:
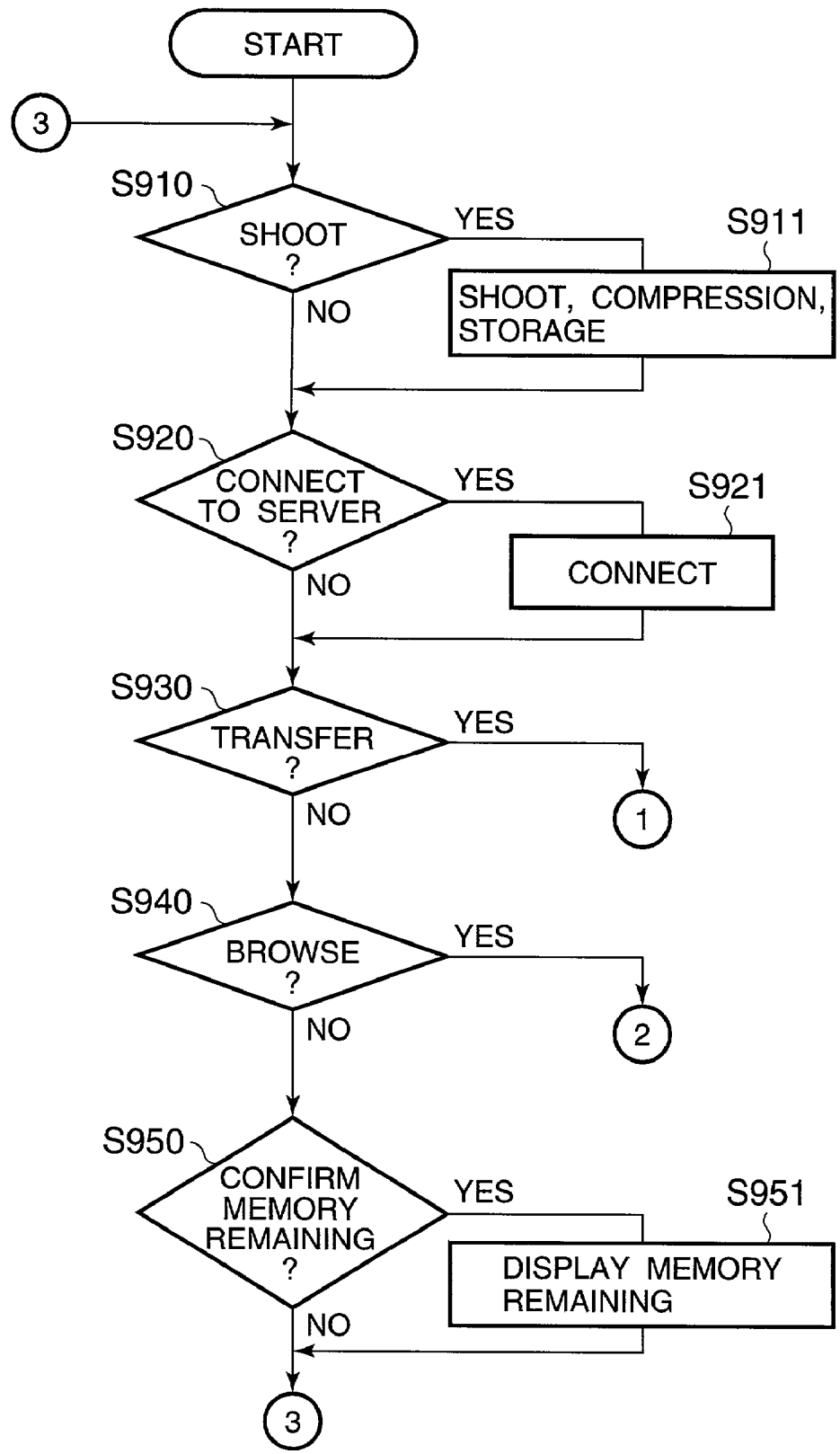
FIG. 8 is a flowchart of the digital camera in the embodiment of the present invention.
Figure 9:
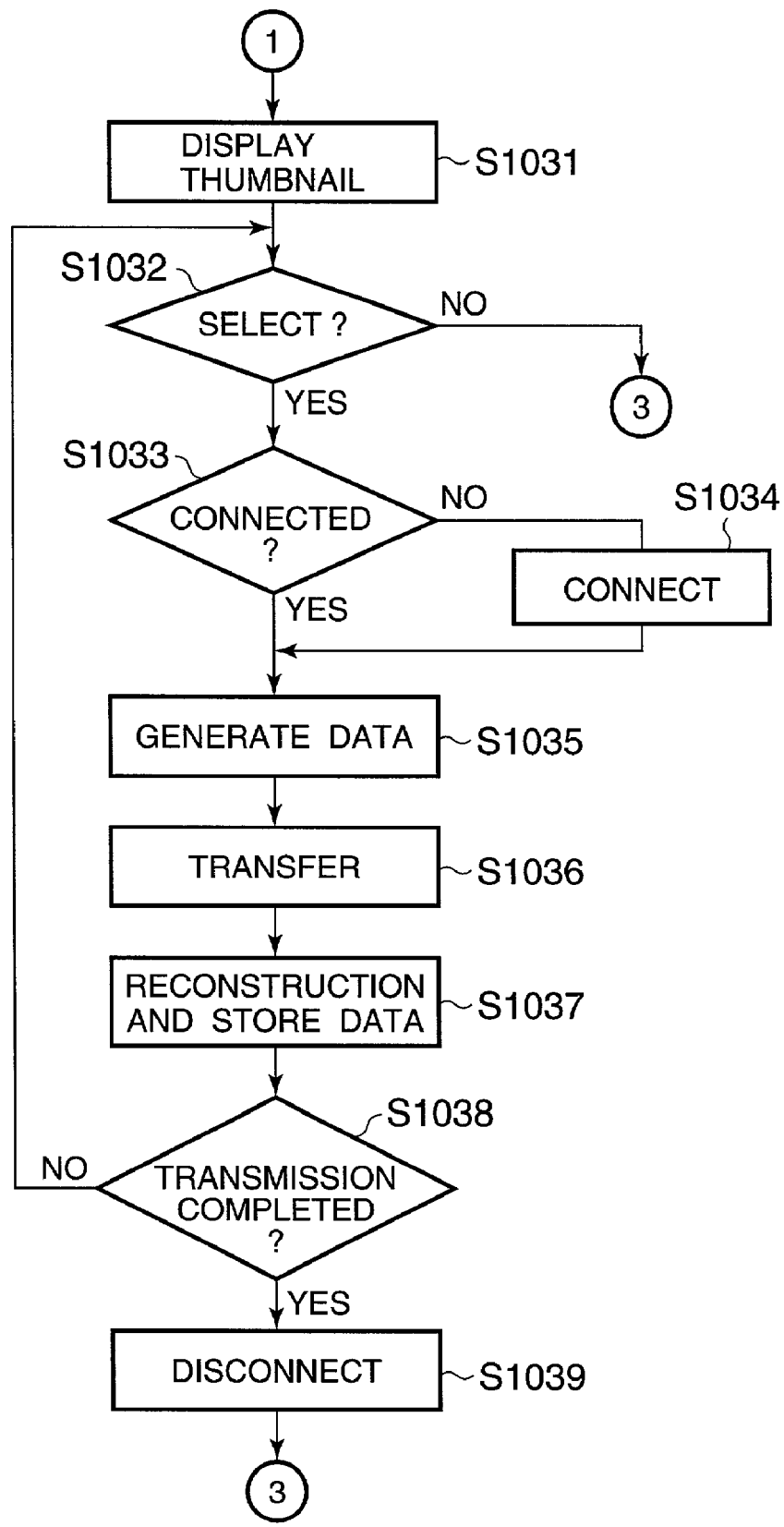
FIG. 9 is a flowchart of the digital camera at the time of data transfer in the embodiment of the present invention.
Figure 10:
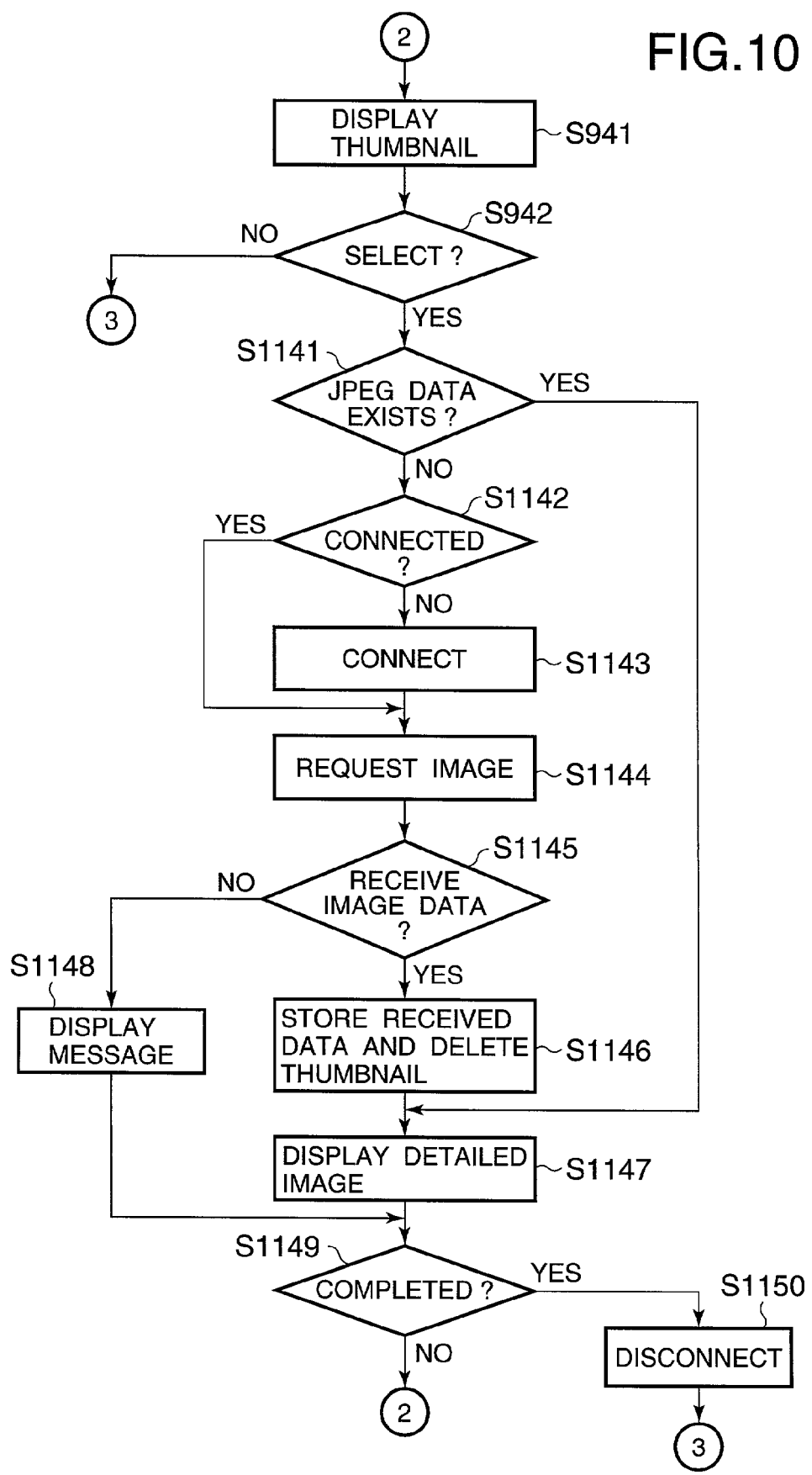
FIG. 10 is a flowchart of the digital camera at the time of display of a fine image in the embodiment of the present invention.

A sequence for transfer of data between the digital camera 300 and the image server 400 will be described with reference to FIG. 1 and FIGS. 8 to 11. In FIG. 1, the states of intervention of the base station 701 and the base station 702 between the digital camera 300 and the image server 400 are omitted. FIGS. 8, 9, and 10 are flowcharts showing the operation of the control unit 310 of the digital camera 300, and FIG. 11 is a flowchart showing the operation of the control unit 408 of the image server 400.

The control unit 310 of the digital camera 300 is a computer which reads out a program stored in the memory 302 to perform the operation shown in FIGS. 8 to 10. The flowcharts in FIGS. 8 to 10 show a part of the program stored in the memory 302 provided as a storage medium so as to be readable by the computer.

Figure 11:
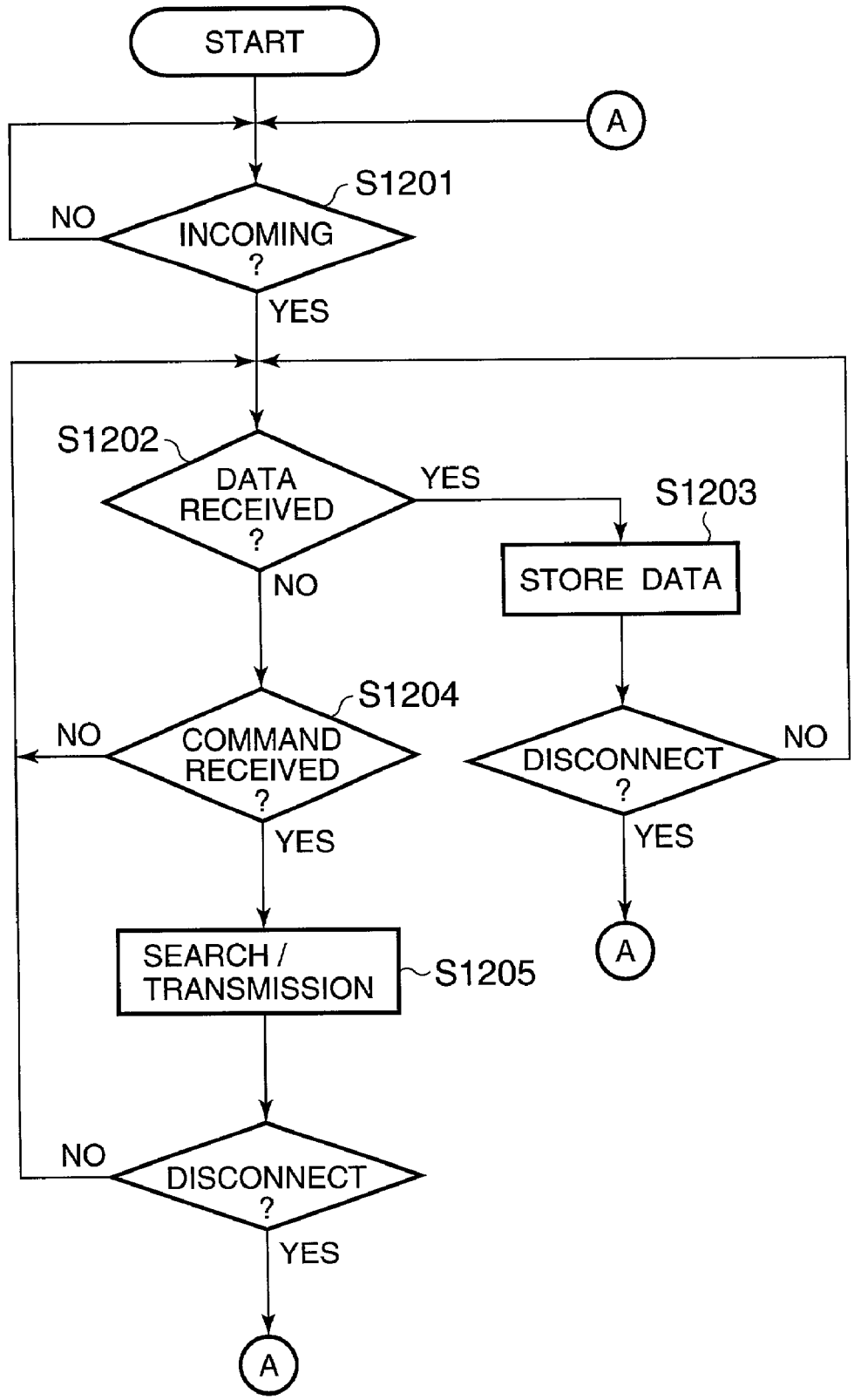
FIG. 11 is a flowchart of the image server in the embodiment of the present invention.

Similarly, the control unit 408 of the image server 400 is a computer which reads out the program stored in the memory 401 to perform the operation shown in FIG. 11. The flowchart in FIG. 11 shows a part of the program stored in the memory 401 provided as a storage medium so as to be readable by the computer.

When the digital camera 300 is operated for picture taking (shooting) (S910), the CCD unit 303 performs picture taking and an image thereby obtained by the CCD unit 303 is compressed into JPEG data by the compression unit 304 and written in DCF format to the memory 302 (S911). The data written in DCF format at this time is formed of SOI, APP1 including the photography date and time information and a thumbnail image, the JPEG compressed image data, and EOI, as described above. The format of the image data is not limited to DCF, and any other format may alternatively be used. In such a case, the compression method is not limited to JPEG.

When the photographer takes several pictures, data in DCF format corresponding to the number of pictures taken is stored in the memory 302.

If in this state the operator operates the communication control switch of the operation unit 301 to input an instruction to establish connection to the image server 400 (S920), the control unit 310 of the digital camera 300 controls the communication unit 307 to establish connection F1 to the image server 400 (S921). This connection processing is unnecessary if a continuous connection type of communication system is used.

Connection to the image server 400 is executed by the operator of the digital camera 300 performing the calling operation to the telephone number assigned to the USIM 406 on the server 400 side.

The operator then operates the transfer switch of the operation unit 301 (S930). The control unit 310 reads out thumbnail data shown in FIG. 6, stored in the memory 302, and displays a list of the thumbnail data on the display unit 306 (S1031). When the operator selects by the selecting switch some of the images which he or she wishes to transfer to the image server 400 (S1032), connection is established (S1034) if connection to the server 400 is not completed (S1033). The operator performs selecting in this step while checking the image to be transferred on the display unit 306.

Figure 5:
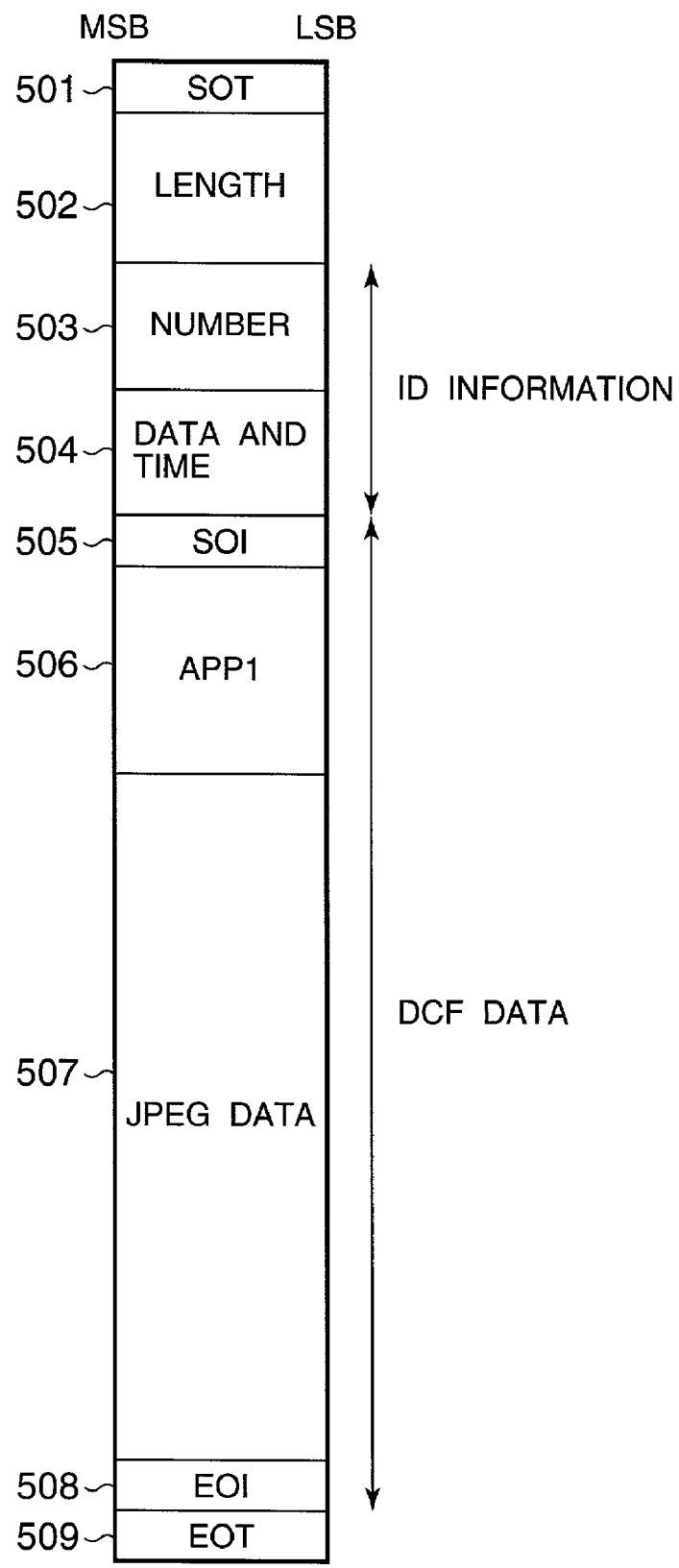
FIG. 5 is a diagram showing a format of transferred data in a system in the embodiment of the present invention.

The control unit 310 generates data to be transferred, in which, as shown in FIG. 5, ID information 503 and 504, header information 501 and 502 and EOT (End Of Transmission) information 509 designating the end of the frame are added to the DCF data 505 to 508 (S1035). The DCF data is the image data obtained by picture taking in step S911. APP1 in this data includes thumbnail data and the photography date and time information.

The header information is formed of SOT (Start Of Transmission) information 501 designating the beginning of the data to be transferred, and information 502 indicating the data length of the entire frame. The ID information is formed of telephone number information 503 read out from the USIM 308 provided as a detachable component, and the date and time data 504 written in APP1 information 506. This telephone number information may be stored in the memory 302.

Telephone number information 503 is information for identification of the public wireless network 703 subscriber who is to be charged from the public wireless network 703 for use of the same. In this system, telephone number information 503 is information for identification of the person who is to be authenticated as a user of the digital camera 300. If the image server 400 is offered a caller identification notification service from the public wireless network 703, it is not necessary to include this identification information in the data to be transferred. ID information other than telephone number information 503 may be provided for identification of the user by the server 400. Also, the image server 400 may generate discrimination data for discrimination of stored images and send the data to the digital camera 300.

The control unit 310 transfers (F2 to F4) the generated data in the form of a wireless communication signal from the communication unit 307 to the image server 400 over the public wireless network 703 (S1036). In the example shown in FIG. 1, three images are transferred.

Figure 6:
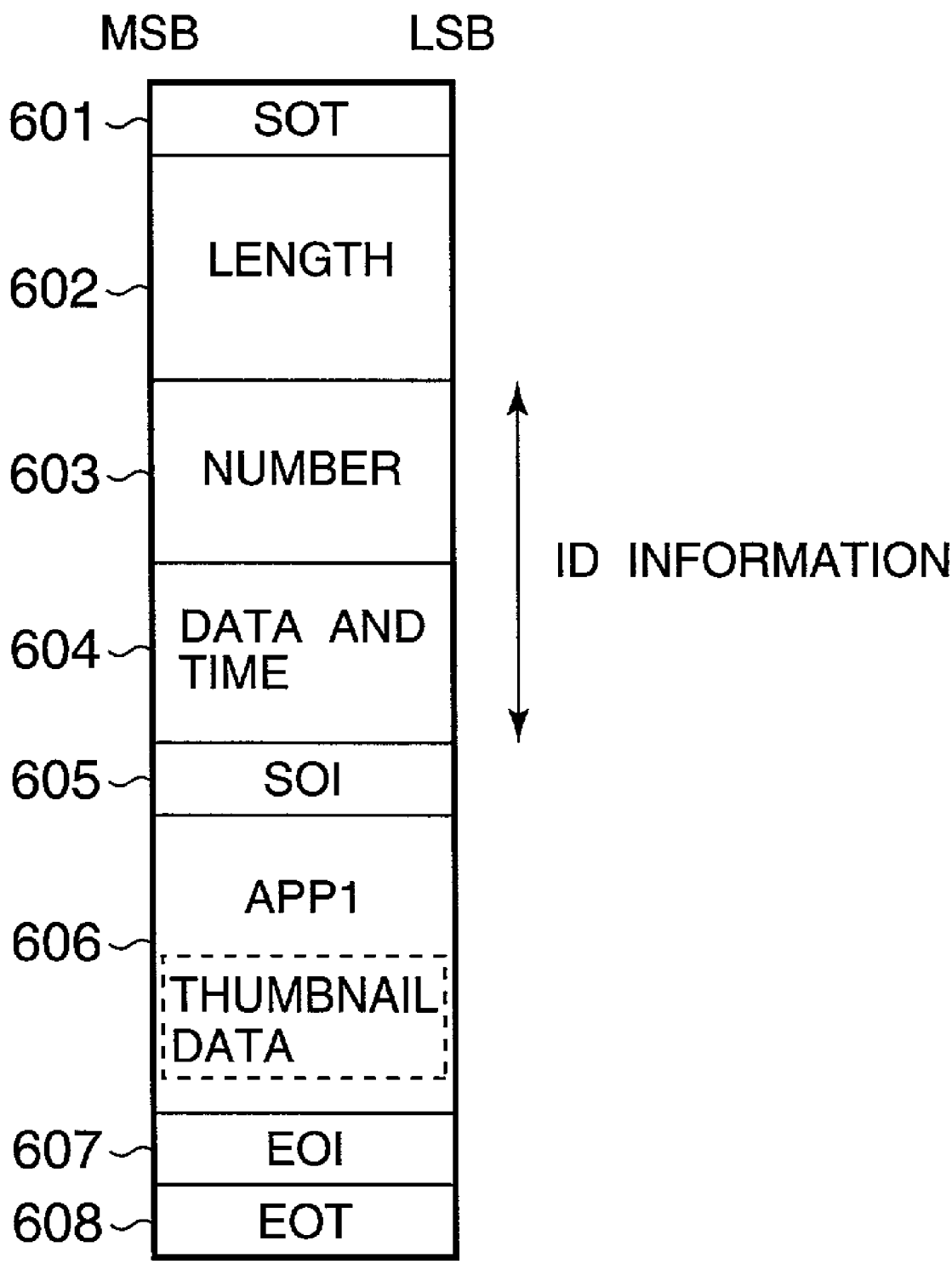
FIG. 6 is a diagram showing a format of thumbnail data in the system in the embodiment of the present invention.

The control unit 310 of the digital camera 300 reconstructs the transferred data into a frame without JPEG data 507 and stores the reconstructed data in the memory 302 (S1037). The frame formed by removing JPEG data 507 has a frame configuration formed only of ID information and thumbnail data, as shown in FIG. 6. This thumbnail data is data obtained by bit reduction from JPEG data 507 to indicate features of JPEG data 507 by an amount of data smaller than that of JPEG data 507. Since JPEG data is removed as described above, the empty space for storage of image data obtained by picture taking in step S911 can be increased. This data reconstruction and saving in step S1037 may be performed before data is stored by picture taking newly performed in step S911 after the completion of data transfer in step S1036.

When the control unit 408 of the image server 400 receives the data formed as shown in FIG. 5 and transferred from the digital camera 300 (S1202) at the time of incoming from the digital camera 300 (S1201), it stores in the HD 402 the transferred data received through the communication unit 405 (S1203). If at this time stored image data having the same ID as the ID information in the transferred data exists in the HD 402, the transferred data is written over the image data already stored. Of the ID information in the data generated in step S1035 to be transferred, the telephone number information may be removed from the data to be transferred, if the image server 400 is notified of the telephone number by a caller number notification service.

If another image is transferred to the image server 400 (S1038), generation of data to be transferred is performed again. When selection of and transfer of images to be transferred are completed (S1038), the control unit 310 of the digital camera 300 cuts (F5) the connection with the image server 400 (S1039). That is, after the completion of data transfer (F2) shown in FIG. 1, the process returns from step S1038 to step S1032 to execute data transfer (F3). After the completion of data transfer (F4), the process advances from step S1038 to step S1039 to cut the connection with the image server 400.

When data transfer by the above-described procedure is completed, the thumbnail data shown in FIG. 6 is stored in the memory 302 on the digital camera 300 side and the transferred data shown in FIG. 5 is stored in the HD 402 on the image server 400 side.

Regarding each of images not transferred to the server 400, a larger amount of image data for fine representation of the image is stored in the memory 302. On the other hand, the control unit 310 of the digital camera 300 stores in the memory 302 the smaller amount of image data for rough representation of the image transferred to the server 400.

That is, larger amounts of image data for fine representation of the images are stored in the image server 400, while smaller amounts of image data for rough representation of the images transferred to the image server 400 are stored in the digital camera 300. Also, discrimination data for searching the larger amounts of image data for fine representation of the images is stored in the image server 400, and discrimination data for searching the smaller amounts of image data for rough representation of the images is stored in the digital camera 300. The digital camera 300 stores the thumbnail image data and the discrimination data in a state of being related to each other, and the image server 400 stores the fine image data and the discrimination data in a state of being related to each other.

This discrimination data includes the telephone number of the digital camera 300, i.e., data for identification of the public wireless network 703 subscriber, and data on the date and time of photography of each image. When the smaller amount of image data for rough representation of one image is transmitted from the digital camera to the image server 400, the image server 400 searches for the larger amount of image data for fine representation of the image on the basis of the discrimination data transmitted from the digital camera 300.

While the discrimination data including the user identification number and data on the date and time has been described, any other data may be used if it enables a selected image in a plurality of images to be discriminated from the others. Such discrimination data for searching images may be prepared in the image server 400 and sent to the digital camera 300.

To browse thumbnail data, the operator of the digital camera 300 performs an operation for browsing (S940). The control unit 310 then displays on the display unit 306 data on one or a plurality of thumbnail images stored in the memory 302 of the digital camera 300 to enable the operator to browse the images (S941). Image data stored in the memory 302 includes image data having JPEG data and image data having no JPEG data. However, the control unit 310 reads out the thumbnail image data contained in APP1 from either type of image data and displays the thumbnail image data on the display unit 306.

If the operator wishes to view some finer image from the displayed thumbnail images, he or she operates the operation unit 301 on the digital camera 300 side to select the thumbnail of the fine image to view (S942). If the selected image is one having its JPEG data 507 removed in step S1037 (S1141), and if the digital camera 300 is not connected to the image server 400 (S1142), the control unit 310 performs the calling operation to connect (F6) to the image server 400 (S1143). This connection processing is unnecessary in a case where a continuous connection type of communication system is used.

Further, the control unit 310 transmits (F7) to the image server 400 a command (search request) for transmission of the image data containing ID information 604 and 605 in the thumbnail data stored in the memory 302 (S1144). This command is transmitted as a wireless communication signal from the communication unit 307 to the image server 400 over the public wireless network 703. Of this ID information, the telephone number information may be removed from the transmission command if a caller number notification service is used.

When receiving this command (request) (S1204), the control unit 408 of the image server 400 searches a plurality of groups of image data stored in the HD 402 and having the format shown in FIG. 5 to identify the corresponding image data from the received ID information. The control unit 408 transfers (F8) the identified image data to the digital camera 300 through the communication unit 405 (S1205). Caller information notified in a caller information notification service may be used as ID information. If information other than the information for identification of the subscriber to be charged from the public wireless network 703 for use of the same is provided as ID information, this ID information may be used.

If there is no data corresponding to the received ID information in the stored image data, the image server 400 sends a command indicating the absence of the data to the digital camera 300.

When the control unit 310 of the digital camera 300 receives the image data as a wireless signal from the communication unit 307 (S1145), it writes the received image data to the memory 302. Simultaneously, the control unit 310 deletes the thumbnail data corresponding to the received data (S1146), which has been stored in the memory 302, because this thumbnail data becomes useless. Alternatively, the received JPEG data 507 may be added to the thumbnail data already stored in the memory to be stored.

This received image data has an amount of data larger than that of the thumbnail data and enables fine representation of the image. Deletion of the thumbnail data may be performed at the time of the next picture taking instead of being performed at this step.

The fine image is displayed on the display unit 306 on the basis of the received image data (S1147). This fine image is displayed more finely in comparison with the thumbnail image displayed in step S941.

However, if the command indicating the absence of the necessary data is received by the digital camera 300, the control unit 310 displays a message indicating the absence of the corresponding data on the display unit 308 (S1148).

If the operator of the digital camera 300 wishes to another fine image (S1149), the process returns to step S941 and the operator selects another image from the displayed thumbnails. When the corresponding ID information is transmitted (F9) to the image server 400, the image server 400 reads out the stored image data corresponding to the received ID information from the HD 402 and transmits (F10) the image data to the digital camera 300. The digital camera 300 again stores the received image data in the memory 302 and deletes the corresponding thumbnail data.

If JPEG data 507 corresponding to the selected thumbnail is stored in the memory 302 without being deleted, this data is read out from the memory 302 and displayed on the display unit 306 (S1147).

To terminate transfer of fine image data from the image server 400, the control unit 310 of the digital camera 300 cuts (F11) the connection with the image server 400 (S1150).

In the digital camera 300, the vacant memory space in the memory 302 can be displayed (S951) on the display unit 306 by an operation through the operation unit 301 (S950) to be checked. When the remaining memory space becomes small, the image data in the memory 302 may be transferred to the image server by the above-described procedure to delete the image data while leaving only the thumbnail data. In this manner, the vacant memory space (area for storage of image data obtained by picture taking in step S911) in the memory 302 can be increased. This deletion of JPEG data may be performed before picture taking newly performed after the completion of data transfer to the image server 400.

The digital camera 300 may be operated through the operation unit 301 to delete the image data in the memory 302 without transferring the data. It is also possible to delete the thumbnail data.

While the image file format has been described as a format in accordance with the DCF standard, image files may be formed in any other different format. Images obtained by picture taking are not limited to still images. Image data on moving images and sound may also be handled in the system of the present invention. Moving images may be compressed by an MPRG method to be stored instead of being JPEG compressed. In such a case, a typical scene (e.g., a first scene after a start of picture taking, or a scene designated by the operator) may be compressed and stored as JPEG thumbnail data.

That is, the memory 302 stores moving image data and typical scene data. When moving image data is transmitted through the communication unit 307 (S1036), the transmitted moving image data is deleted from the memory 302 to increase an area in the memory 302 where data can be stored (S1037). In the browsing mode (S940), if one of typical scenes stored in the memory 302 is selected (S942), a search request for searching for the image data corresponding to the selected typical scene is transmitted from the communication unit 307 to the image server 400.

While the wireless communication means in accordance with IMT-2000 has been described, any other wireless communication means may alternatively be used. If a wireless communication means different from the described one is used, the identification means may be constituted by a memory card or the like in which a telephone number is stored, other than the USIM.

While an example of digital camera 300 in which the communication unit 307 is incorporated has been described with reference to FIG. 3, a digital camera provided as an image communication device may be connected to a portable telephone capable of wireless communication over public wireless network 703 by a cable or short-distance wireless communication (e.g., wireless communication by a frequency hopping method) to send image data by wireless communication.

In such a case, for the data 503 for identification of a user, user identification data may be added to data to be transferred in the digital camera or user identification data may be added in the portable telephone. Further, for the date and time data 504, the photography date and time information is added to data to be transferred in the digital camera or the transfer date and time information is added in the portable telephone. Data other than the date and time information may be provided as discrimination data for searching transferred images.

If image discrimination data is prepared on the portable telephone side in the case where thumbnail data is stored on the digital camera side, the portable telephone sends the discrimination data to the digital camera and the digital camera stores thumbnails in a state of being related to the discrimination data.

The present invention can also be applied to a personal computer or a portable telephone having no CCD unit 303 and having images input thereto from a memory card. After fine image data in the memory card has been transferred to the image server, it is replaced with a smaller amount of data, i.e., thumbnail data.

When the thumbnail corresponding to one of images stored in the image server 400 is selected, the selected image may be transferred from the image server 400 to a device other than the digital camera 300. For example, the image data may be sent to a printing machine connected to the public network 703 to use an image data printing service. Also, the image data may be transferred to a user's personal computer other than the digital camera 300. In such a case, the thumbnail of the image to be transferred is selected and the destination is designated through the operation unit 301. The selected image may be output from a printer connected to the image server 400 without being transmitted over the public wireless network.

The present invention can also be applied even in a case where a person other than one who has registered an image in the server 400 extracts the image from the server 400. In this case, thumbnail data shown in FIG. 6 may be obtained by transfer from the person who has registered the image in the server 400.

That is, when an image is registered in the server 400, the thumbnail shown in FIG. 6 is stored in the memory 302. The operator operates the operation unit 301 to perform the calling operation to the transfer destination and, after the establishment of connection to the transfer destination, transmits thumbnail data (to which discrimination information for searching is added). On the other hand, at the transfer destination, a response to the incoming from the transfer source is made and, after the establishment of connection to the transfer source, the thumbnail data is received. The transfer source terminal then cuts the connection to the transfer destination. Thereafter, the transfer source terminal accesses the server 400, sends discrimination information corresponding to the image to be viewed to the image server 400, and receives the image stored in the server 400, as it does by F6 to F11 shown in FIG. 1. In this case, thumbnail data shown in FIG. 6 may be obtained from a memory medium such as a compact disk (CD) without transmission over the public wireless network 703.

The present invention has been described with respect to preferred embodiments thereof. However, the present invention is not limited to the configurations of the above-described embodiments, and various modifications and changes of the described embodiments may be made without departing from the scope of the invention as set forth in the appended claims.

What is claimed is:

1. A communication device comprising:
   memory means for storing detailed image data and reduced image data;
   transmission means for transmitting the detailed image data to an image storage unit; and
   selection means for selecting the reduced image data stored in the memory means,
   wherein said memory means deletes the detailed image data after the transmission of the detailed image data by said transmission means, while maintaining the reduced image data corresponding to the transmitted detailed image data,
   and wherein said transmission means transmits to the image storage unit the detailed image data with identification data of said transmission means, and transmits to the image storage unit a search request for searching for the detailed image data corresponding to the reduced image data selected by said selection means from detailed image data stored in the image storage unit corresponding to the identification data of said transmission means.

2. A communication device comprising:
   memory means for storing image data and thumbnail data;
   transmission means for transmitting the image data to an image storage unit; and
   selection means for selecting the thumbnail data stored in said memory means,
   wherein said memory means deletes the image data after the transmission of the image data by said transmission means, while maintaining the thumbnail data corresponding to the transmitted image data,
   and wherein said transmission means transmits to the image storage unit the image data with identification data of said transmission means, and transmits to the image storage unit a search request for searching for the image data corresponding to the thumbnail data selected by said selection means from image data stored in the image storage unit corresponding to the identification data of said transmission means.

3. A communication device comprising:

memory means for storing moving image data and typical scene data;

transmission means for transmitting the moving image data to an image storage unit; and selection means for selecting the typical scene data stored in said memory means, wherein said memory means deletes the moving image data after the transmission of the moving image data by said transmission means, while maintaining the typical scene data corresponding to the transmitted moving image data, and wherein said transmission means transmits to the image storage unit the moving image data with identification data of said transmission means, and transmits to the image storage unit a search request for searching for the moving image data corresponding to the typical scene data selected by said selection means from moving image data stored in the image storage unit corresponding to the identification data of said transmission means.

4. A communication system comprising a communication device and an image storage unit connected to said communication device through a public network, said communication device comprising:

memory means for storing image data and thumbnail data;

transmission means for transmitting the image data to said image storage unit; and selection means for selecting the thumbnail data stored in said memory means, wherein said memory means deletes the image data after the transmission of the image data by said transmission means, while maintaining the thumbnail data corresponding to the transmitted image data, and wherein said transmission means transmits to said image storage unit a search request for searching for image data corresponding to the thumbnail data selected by said selection means, said image storage unit comprising:

storage means for storing the image data;

detection means for receiving the search request and detecting user information used for identification of a user from the public network; and search means for searching for, according to the user information, the image data stored in the storage means.

5. A method of data communication with an image storage unit, comprising the steps of:

transmitting from a transmission unit to the image storage unit image data stored in a memory with identification data of the transmission unit;

deleting the image data after the transmission of the image data in said transmitting step, while maintaining thumbnail data corresponding to the transmitted image data;

selecting the thumbnail data stored in the memory; and transmitting from the transmission unit to the image storage unit a search request for searching for the image data corresponding to the thumbnail data selected in said selecting step from image data stored in the image storage unit corresponding to the identification data of said transmission means.

6. A communication program for performing data communication with an image storage unit, said program comprising the steps of:

transmitting from a transmission unit to the image storage unit image data stored in a memory with identification data of the transmission unit;

deleting the image data after the transmission of the image data in said transmitting step, while maintaining thumbnail data corresponding to the transmitted image data;

selecting the thumbnail data stored in the memory; and transmitting from the transmission unit to the image storage unit a search request for searching for the image data corresponding to the thumbnail data selected in said selecting step from image data stored in the image storage unit corresponding to the identification data of said transmission means.

7. A communication device according to claim 1, wherein the identification data of said transmission means is read out from a module detachable to the communication device and transmitted by said transmission means to the image storage unit.

8. A communication device according to claim 2, wherein the identification data of said transmission means is read out from a module detachable to the communication device and transmitted by said transmission means to the image storage unit.

9. A communication device according to claim 3, wherein the identification data of said transmission means is read out from a module detachable to the communication device and transmitted by said transmission means to the image storage unit.

10. A communication system according to claim 4, wherein said transmission means transmits to the image storage unit the image data with user information.

11. A communication device according to claim 10, wherein the user information is read out from a module detachable to the communication device and transmitted by said transmission means to the image storage unit.

12. A method according to claim 5, wherein the identification data of said transmission means is read out from a module detachable to the communication device and transmitted in said image data transmission step to the image storage unit.

13. A communication program according to claim 6, wherein the identification data of said transmission means is read out from a module detachable to the communication device and transmitted in said image data transmission step to the image storage unit.

* * * * *

UNITED STATES PATENT AND TRADEMARK OFFICE
CERTIFICATE OF CORRECTION

PATENT NO. : 7,075,573 B2  Page 1 of 1
APPLICATION NO. : 10/011404
DATED : July 11, 2006
INVENTOR(S) : Eiji Imaeda It is certified that error appears in the above-identified patent and that said Letters Patent is hereby corrected as shown below:

COLUMN 1:
Line 25, "Identify" should read -- Identity --.

COLUMN 4:
Line 19, "unit 300." should read -- unit 310. --.

COLUMN 5:
Line 65, "realized" should read -- realize --.

COLUMN 6:
Line 1, "unit 400" should read -- unit 408 --;
Lines 8, 11 and 17, "USIM 407" should read -- USIM 406 --;
Line 13, "USIM 407," should read -- USIM 406, --; and
Line 15, "USIM 407." should read -- USIM 406. --.

COLUMN 10:
Line 26, "unit 308" should read -- unit 306 --;
Line 27, "to" should read -- to view --; and
Line 66, "an MPRG" should read -- an MPEG --.

Signed and Sealed this

Eighteenth Day of March, 2008

JON W. DUDAS
*Director of the United States Patent and Trademark Office*